Figure 1:
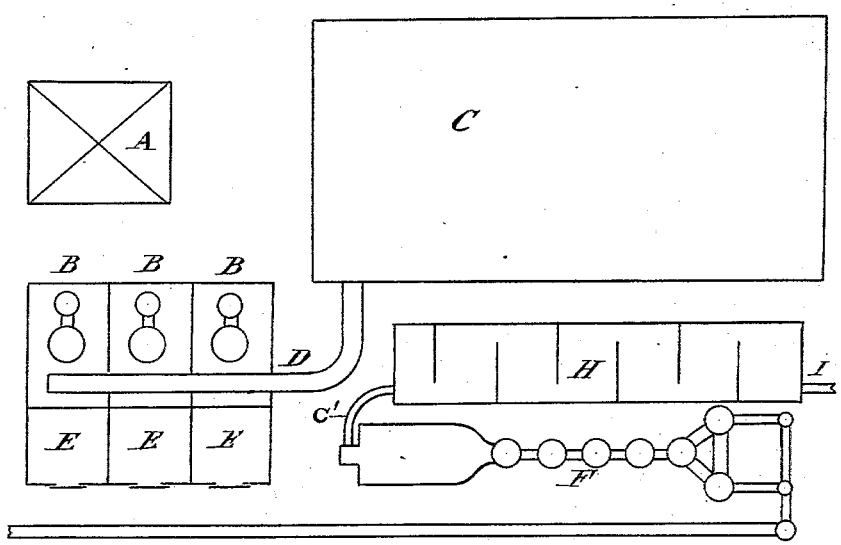

No. 748,662. PATENTED JAN. 5, 1904.
A. M. G. SEBILLOT.
PROCESS OF TREATING COPPER ORES.
APPLICATION FILED NOV. 1, 1901.
NO MODEL. 2 SHEETS—SHEET 1.

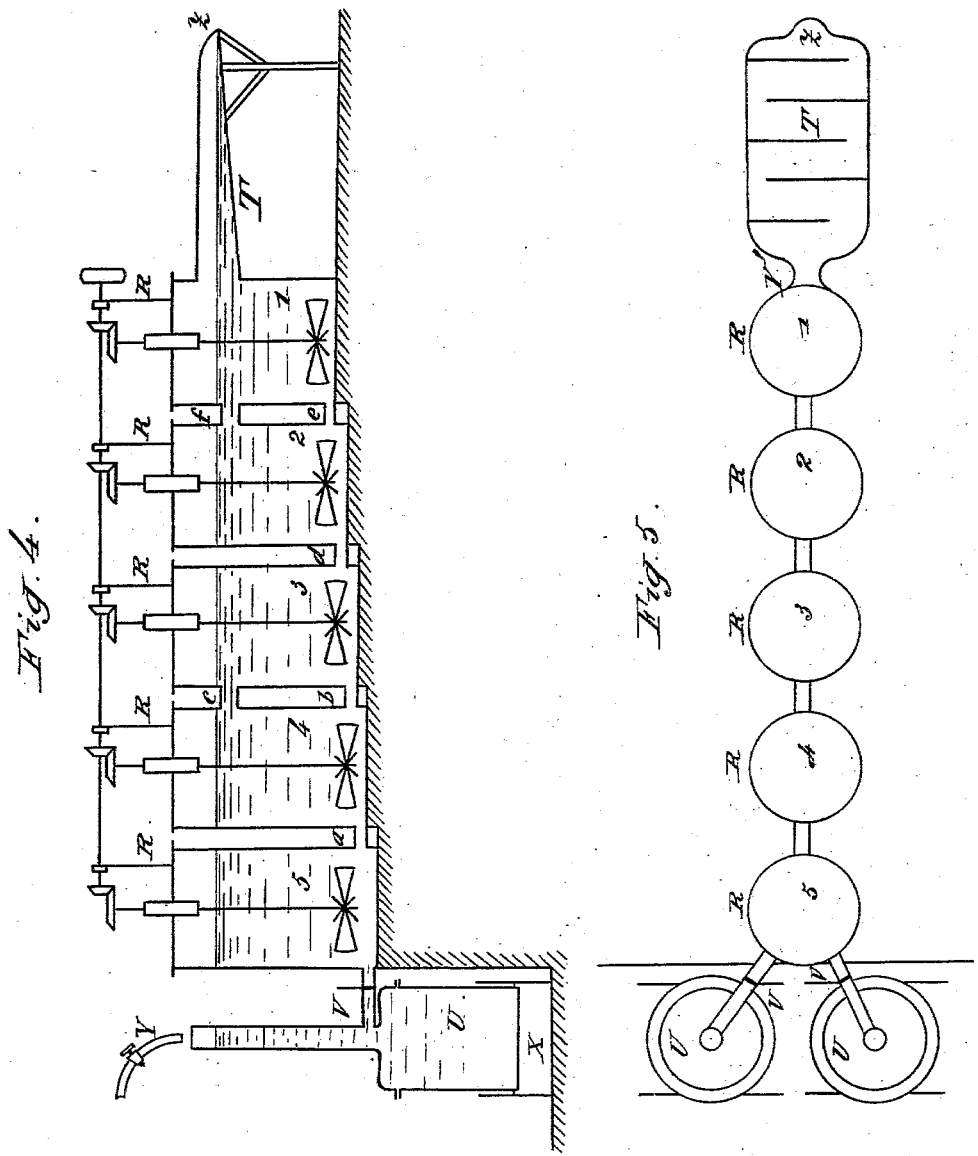

No. 748,662.

Patented January 5, 1904.

UNITED STATES PATENT OFFICE.

AMÉDÉE MATHURIN GABRIEL SÉBILLOT, OF PARIS, FRANCE.

PROCESS OF TREATING COPPER ORES.

SPECIFICATION forming part of Letters Patent No. 748,662, dated January 5, 1904.

Application filed November 1, 1901. Serial No. 80,741. (No specimens.)

*To all whom it may concern:*

Be it known that I, AMÉDÉE MATHURIN GABRIEL SÉBILLOT, a citizen of the French Republic, and a resident of Paris, France, have invented certain new and useful Improvements in Processes for the Treatment of Copper Ores for the Recovery of Metals, of which the following is a specification.

In the treatment of copper ores sulfuric acid is used in a diluted state, which gives good results when the ores are perfectly roasted.

The principle of this new process consists in dispensing with all roasting by treating the finely-pulverized ores with sulfuric acid slightly diluted at the usual temperature of evaporation of sulfuric acid, after which the sulfuric-acid fumes are recovered, as is also the sulfurous anhydrid produced in the reaction, in order to use the sulfuric acid thus reconstituted for fresh operations. The quantity of sulfuric acid used is therefore limited to what is necessary for the transformation of the sulfurous anhydrid produced by the reactions into sulfuric acid.

This process therefore consists, essentially, in directly attacking the raw pulverized ore, whatever is its yield and composition, with sulfuric acid at the required degree of concentration and in excess, so as to insure the complete transformation of the silver, copper, zinc, or other metals into sulfates. This process also provides for the recovery of the whole of the excess acid which has not combined with the copper, silver, or other metals. After this treatment it will only be necessary to dissolve in water (a solution which is almost instantaneously effected) to precipitate the silver by copper and then the copper by iron in the usual manner.

This process was conceived for the treatment of a special ore—gray copper; but from experiments made with all kinds of ores—chalkopyrites, coppery pyrites, and the like—it develops that this method can be advantageously used with all copper ores, the simplest and most complex, (oxids and carbonates without sulfur or alloys of antimony being excepted,) which pass immediately to the state of sulfates by the action of diluted sulfuric acid.

Let us first examine the reaction which takes place in the operation forming the basis of this invention. Let us first consider the simplest form—copper sulfid, ($Cu_2S$.) By attacking with sulfuric acid

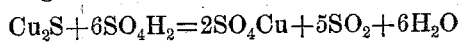

$$Cu_2S + 6SO_4H_2 = 2SO_4Cu + 5SO_2 + 6H_2O$$

is obtained. When protected from the contact of air and if oxygen is formed by the water with liberation of hydrogen, free sulfur should be obtained; but the reaction is not so simple, because at a certain degree of concentration the sulfuric acid itself is partially decomposed and the metal oxidizes and yields sulfurous anhydrid. Moreover, on contact with the air the sulfur itself burns, giving off sulfurous anhydrid, so that as a result we obtain after desiccation a layer of $SO_4CuO$ and inattackable residue and as volatile products surplus sulfuric acid, sulfurous anhydrid, and water. With chalkopyrites, double sulfuret of copper, and iron ($FeS_2 - Cu_2S$,) the copper and iron are transformed into sulfates; but as at that temperature of reaction the iron sulfate is not stable and yields up sulfuric anhydrid it follows that sulfuric acid radical is obtained in excess of the quantity required to form copper sulfate. Coppery iron pyrites used for the manufacture of sulfuric acid for commercial purposes gives a still greater excess of sulfuric acid over that required to form sulfate of copper, and consequently the reaction is of a nature to perform an important transformation in the manufacture of sulfuric acid from iron pyrites. For instance, in the case of a pyrite containing five per cent. of copper, forty-five per cent. of iron, and forty-five per cent. of sulfur with five per cent. of gangue nine times more sulfuric acid is obtained than is required to form sulfate of copper. In the reaction the sulfuric acid attacks the metals by separating the sulfur and forming sulfates of copper and of iron; but as the sulfate of iron is not stable the result of the operation is sulfate of copper containing the whole of the copper, sulfate of silver, if this metal is present, specular iron, and the gangue remaining in the apparatus, while the separated sulfur is burned during this operation and passes into the state of sulfurous anhydrid. Hence it results that this operation can be substituted for the ordinary roasting of the pyrites in ovens and offers besides a great economy of labor, the advantage of yielding gases richer in sulfurous anhydrid, and obtaining the whole of the copper in a single operation, which may be considered as a sulfatizing roasting.

It is known that in order to extract copper from roasted pyrites by the usual methods it is necessary to submit the roasted product to a chloridizing calcination. This operation may be avoided by this process, because the whole of the copper can be dissolved by a single operation. This process can therefore cause an important revolution in the manufacture of sulfuric acid from pyrites. The formula for treating the pyrites can be written as follows:

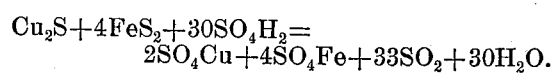

For gray coppers this method is indispensable, because if an ore is taken of the formula:

then at roasting we have

compounds in which the copper is insoluble. By the new process we have

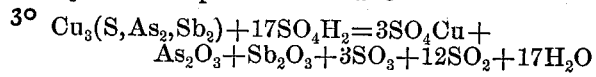

and the whole of the copper as well as the silver (if any is present) is obtained.

Ores may be used of any formula; but the result will be the same by reason of the stability of the sulfates of copper and silver and the affinity of these metals for sulfuric acid.

The process is all the more certain, because there is no inconvenience in using acid in excess. All that has not combined is recovered. On the other hand, the heating and evaporation of sulfuric acid only consume a very little heat, while the caloric capacity and the latent heat for evaporting sulfuric acid are only the third of that of water, and besides this the reactions produce heat. Whatever pyrite is employed after it has passed to the sulfatizing-ovens it is necessary to lixiviate and precipitate the metals while the sulfuric acid is being reconstituted.

Figure 2:
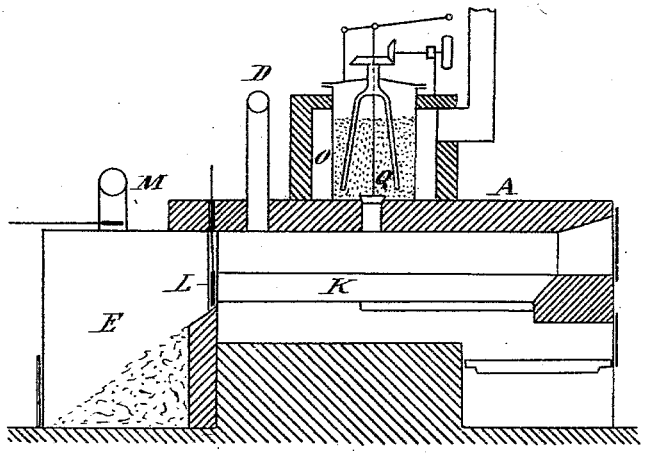
Figure 3:
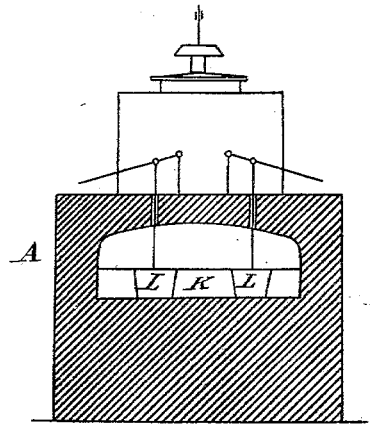

In the accompanying drawings, Figure 1 shows a diagrammatical view of the apparatus used to carry out this process. Fig. 2 shows a longitudinal section of the sulfatizing-oven. Fig. 3 is a cross-section thereof. Fig. 4 is a sectional section of the lixiviating apparatus. Fig. 5 shows a plan view of the same.

The crushing of the ores is effected by any suitable device. The finely-pulverized ores pass to the sulfatizing-ovens B B B. The volatile products leave the lead-chamber by the duct D. The sulfatized ores are received in receptacles E E E, from whence they are taken to be carried to the continuous lixiviating device F. The copper solutions are drawn off through the duct C' to the precipitating-tanks H, the capacities and lengths of which should be sufficient for the copper to be entirely precipitated in the last tank, so that solutions of sulfate of iron escape by the pipe I. The lixiviated residues are carried to the discharge unless they still contain copper and it is considered necessary to treat them again. As to the sulfates of iron they may in certain cases be lost; but it will be nearly always advantageous to concentrate the solutions in order to form vitriol residues and recover the sulfuric-acid fumes, leaving as a residue chemically pure ferric oxid, valuable either as colcothar for various manufacturing purposes or as rough material for the manufacture of steel. As an operation there is a great similitude with that, the object of which is the manufacture of soda by the reaction of sulfuric acid upon sea-salt in suitable cast-iron vessels.

The sulfatizing-oven, composed of a furnace K, is provided with two openings L, closed during the process and which can be opened, so that the material under treatment can be discharged into the cell E, closed during the cooling, and which is surmounted by a pipe M for carrying off the vapors set free. The vapors escape through the pipe D to the lead-chamber C. Charging takes place by the vault. The material is previously heated in a cast-iron receptacle O, heated by the waste flames of the furnace. This receptacle is provided with a mixer P, the material being withdrawn by lifting out the plug Q. When the sulfatized ore has been withdrawn, it is necessary to leach it. Although this is only a simple operation, which is performed in a great many manufactures, there are certain conditions which must be fulfilled in order to have a satisfactory result from the process. These consist principally in the obtaining of concentrated solutions, as well as the total extraction from the ore, without being obliged to shift the material. The essential thing is to cause the cleansing-water to take a direction opposite to that of the ore. For this purpose a series of vats of wood or wood lined with lead R R R are so arranged that the bottoms are stepped one above the other. These vats are furnished with helical mixers which stir the matter from the bottom of the said vats. The first vat is in communication with a trough T, the bottom of which is inclined and provided with staggered plates $t$. The last vat is in communication with two bottle-shaped vats U U, which communicate alternately with the said last vat. The communication between the vats is established in the following manner: The problem to be solved is to cause the pure water contained in U to pass through the vats while the fresh ore placed in the first vat moves in the opposite direction to be deposited on the bottle-shaped vats U after having yielded all the soluble sulfates. In order to make this more clearly understood, the vats will be designated by the numbers 1 2 3 4 5. The vats U communicate with the lower part of 5 and receive water by the pipe Y and delivers it by pipe V to vat 5; but as the ore is kept constantly moving it reaches by this means the vats U, wherein the water is stagnant, and is deposited upon the bottom in the form of slime until the vat is filled, the vats being then withdrawn and replaced by others. These vats being provided with wheels are moved away to be emptied, the ore escaping through a suitable outlet (not shown) in the bottom X. As the fresh ore is charged in a continuous manner into the vat 1 the stirring tends to force the said ore into the successive vats, while the water passing through the opening Y' in the vat 1 enters into the tank T, and, owing to the inclined bottom and the staggered plates, the solutions are clarified and escape in a slightly-muddy state by the nozzle Z, from whence they enter a clarifying-tank. In order to establish a communication between the various vats, a tube $a$, placed at the bottom thereof, leads from vat 5 to vat 4. A smaller tube $b$ leads from the vat 4 to the vat 3. These two vats are also connected at their uppermost part by the pipe $c$. 3 and 2 are connected by the pipe $d$; 2 and 1 by the pipes $e$ and $f$. In this way there is a draining off of the ores by reason of the slope between the vats and of their density, while the water escapes, owing to the difference of level between the water of the vat U and the nozzle Z.

Having now fully described my invention, what I claim, and desire to secure by Letters Patent, is—

The process for extracting pure metals from mineral ores, consisting in treating the ores with sulfuric acid at the evaporating-point of the latter, without roasting, to form sulfates, condensing the surplus acids fumes, and lixiviating the sulfates in successively deeper baths under constant agitation, in a current flowing in direction opposite to the progress of the ores.

In testimony whereof I have hereunto set my hand in presence of two witnesses.

AMÉDÉE MATHURIN GABRIEL SÉBILLOT.

Witnesses:
   ADOLPH STURM,
   J. ALLISON BOWEN.